A. R. A. GÉRARD DE RECONDO.
APPARATUS ENABLING THE SPEED OF MOTOR CARS TO BE REGULATED AND THE EXCESS OF SPEED RECORDED.
APPLICATION FILED NOV. 3, 1908.
1,100,254.
Patented June 16, 1914.
6 SHEETS—SHEET 3.
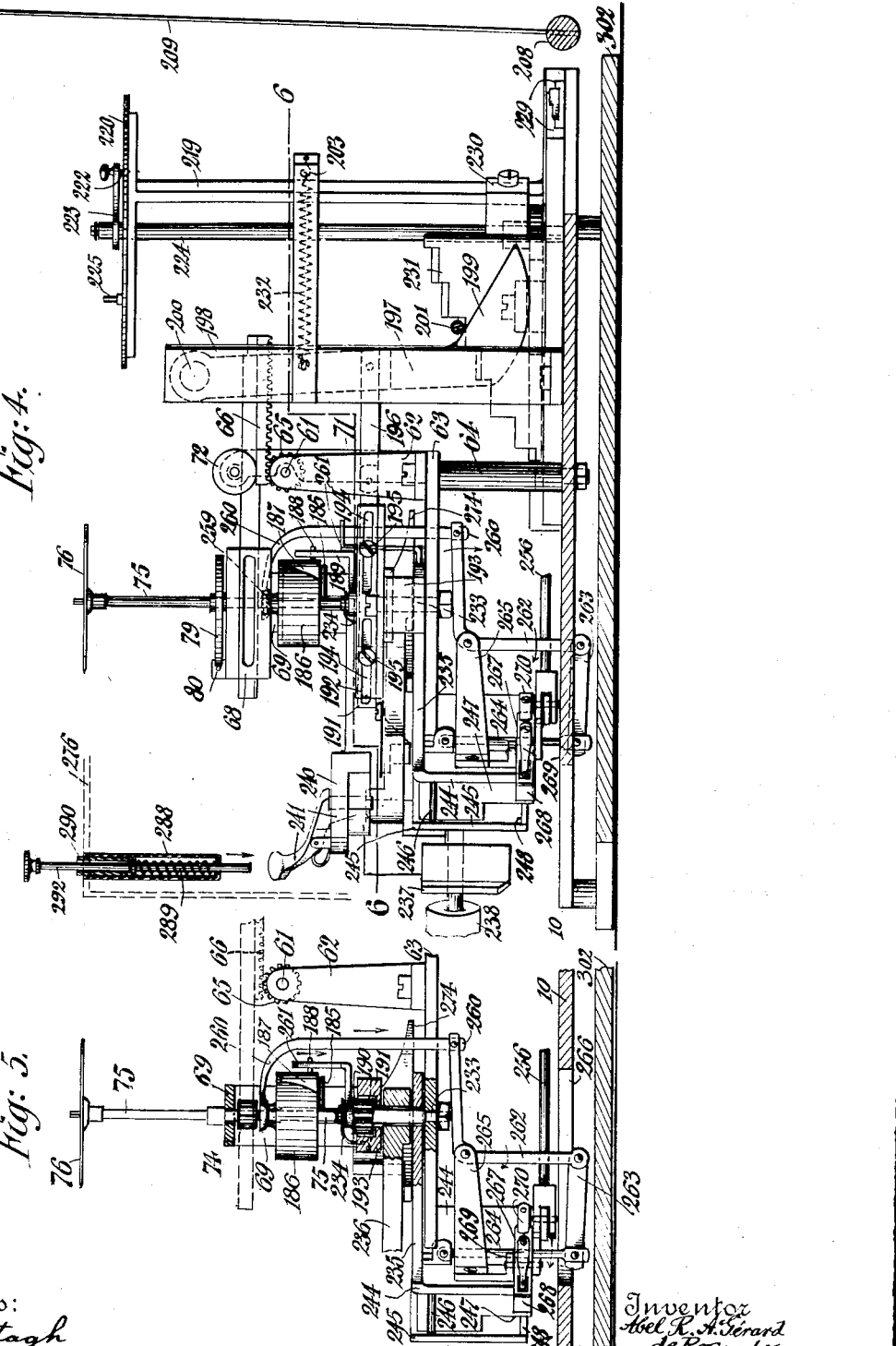

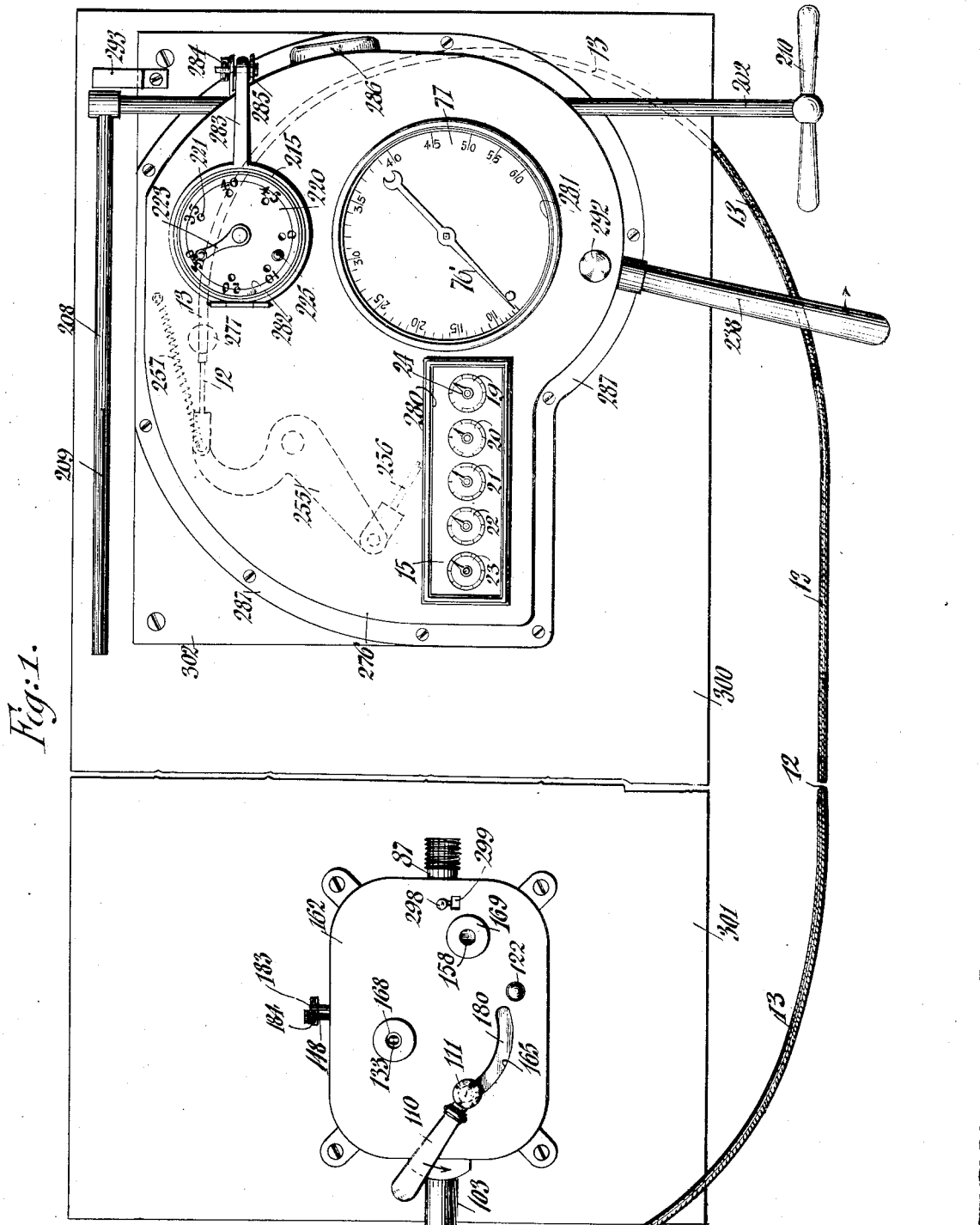

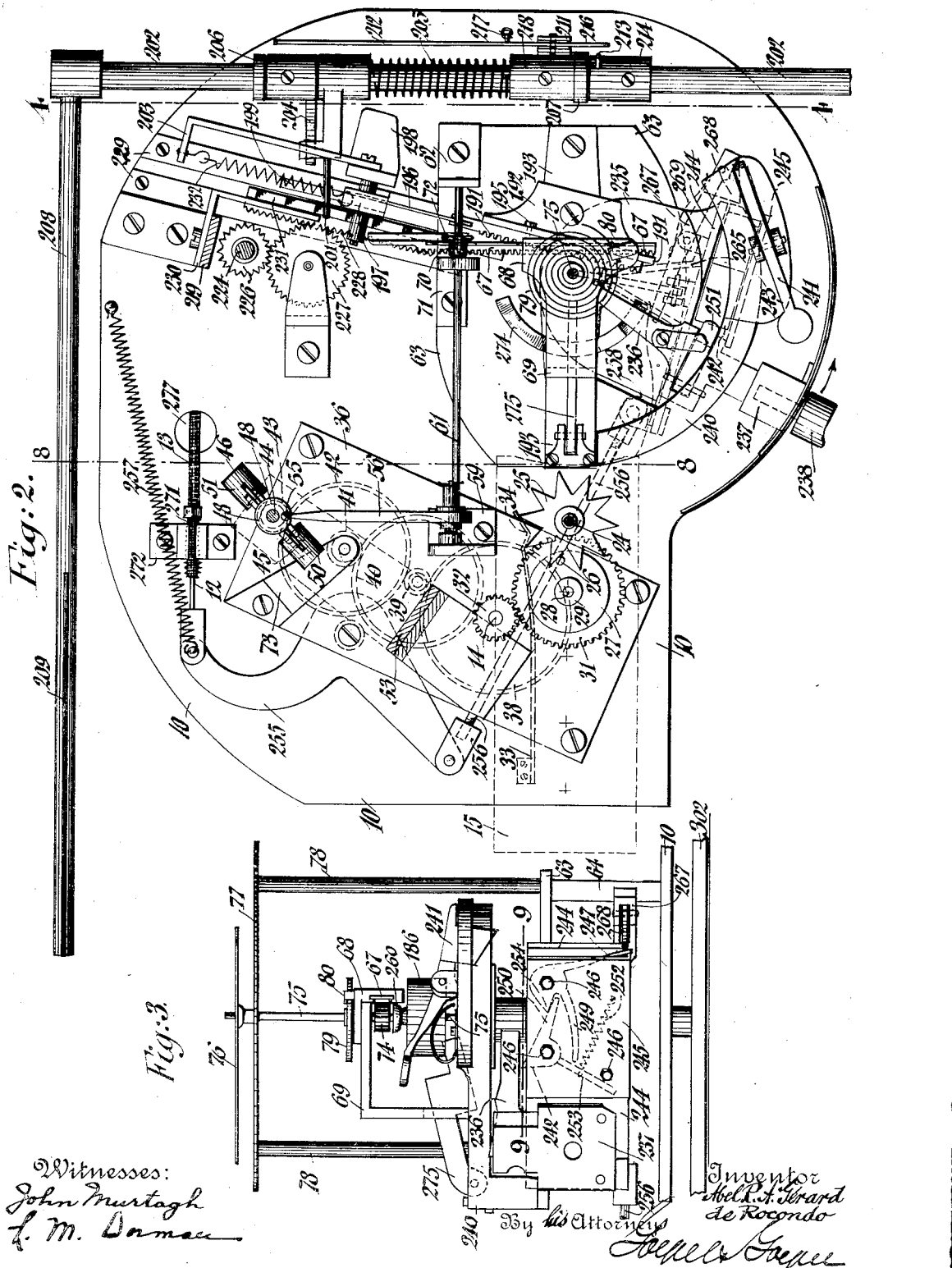

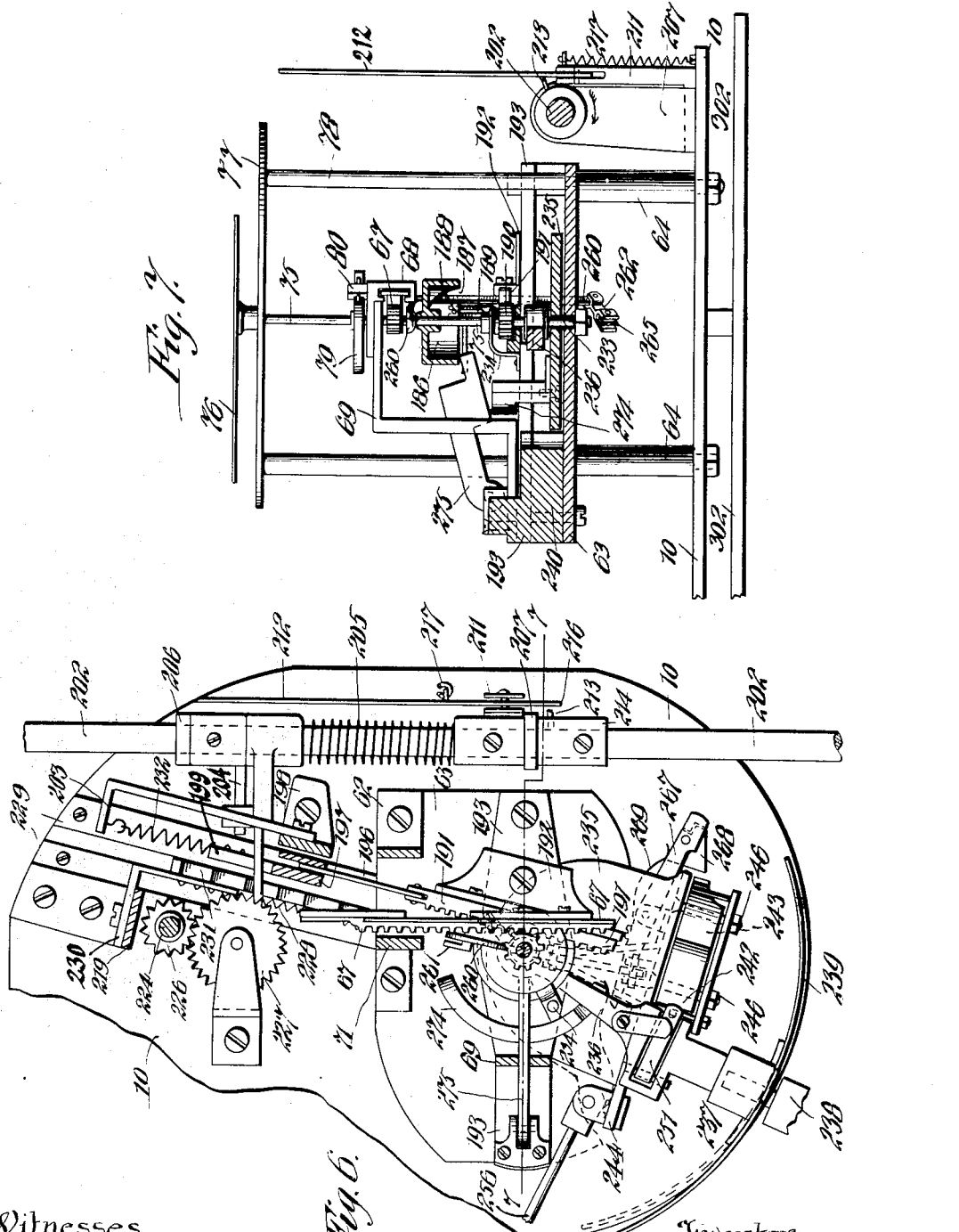

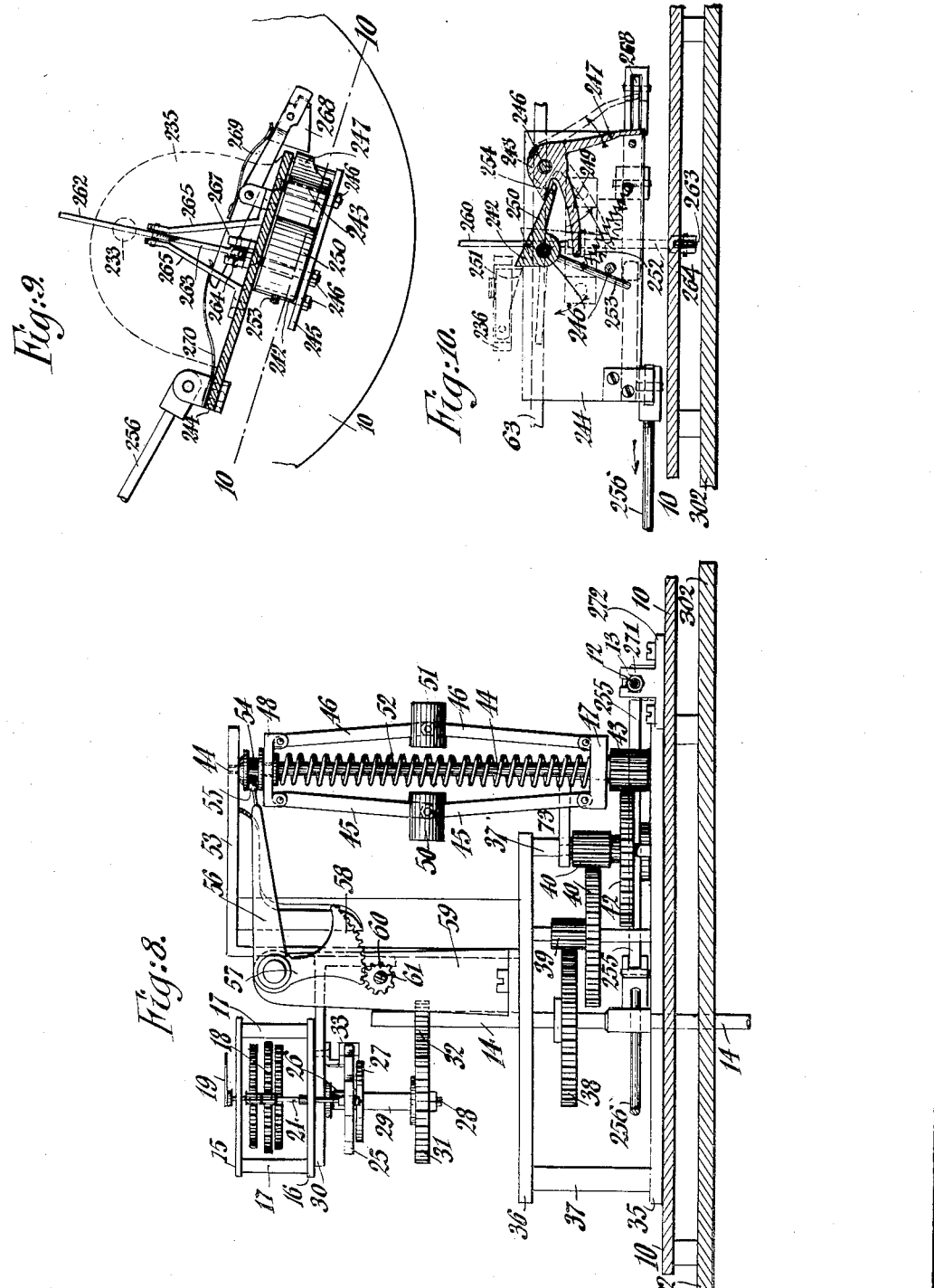

A. R. A. GÉRARD DE RECONDO.
APPARATUS ENABLING THE SPEED OF MOTOR CARS TO BE REGULATED AND THE EXCESS OF SPEED RECORDED.
APPLICATION FILED NOV. 3, 1908.
1,100,254.
Patented June 16, 1914.
6 SHEETS—SHEET 6.
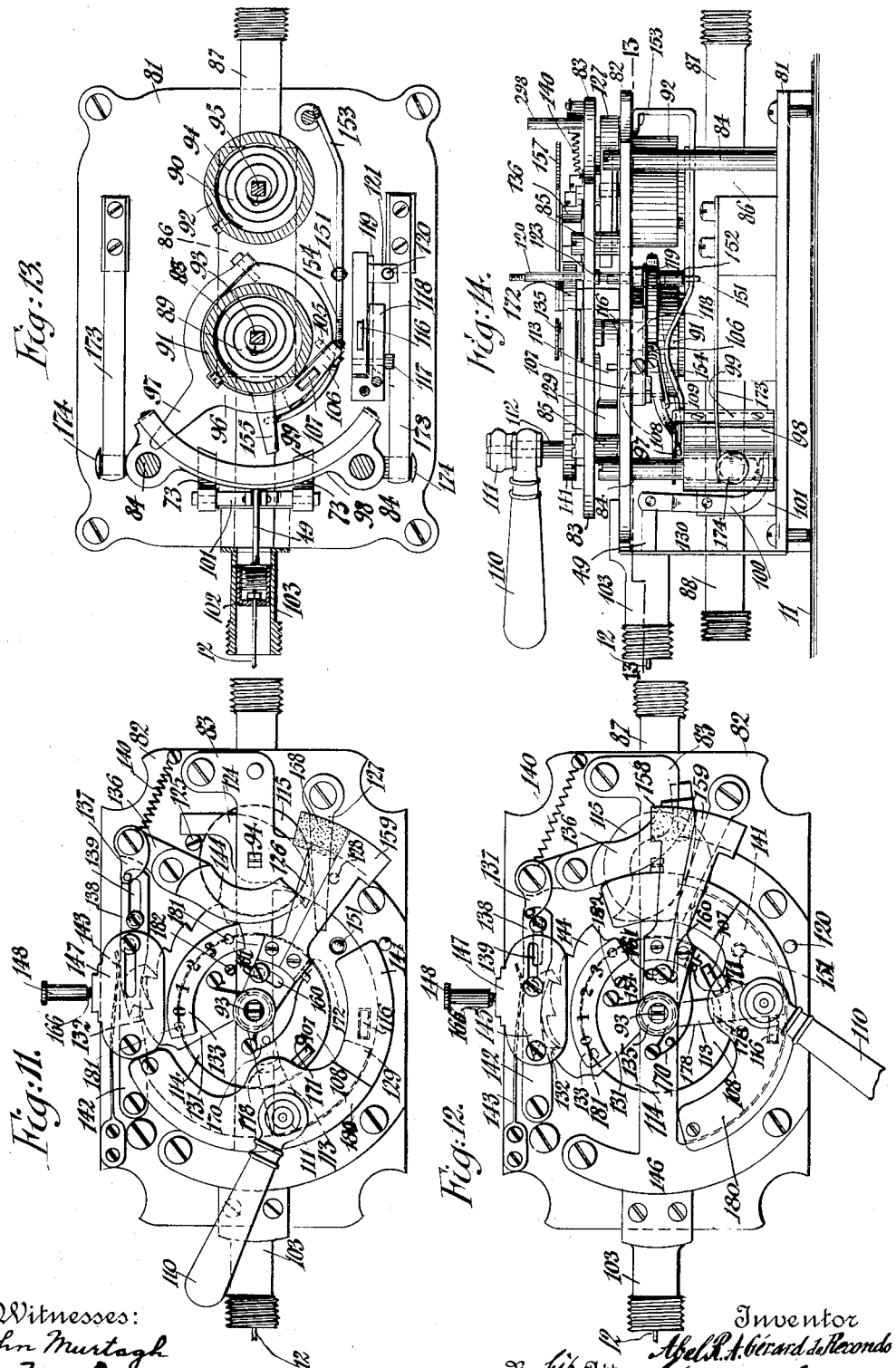
Witnesses:
John Murtagh
L. M. Dorman
Inventor
Abel R. A. Gérard de Recondo
By his Attorney

UNITED STATES PATENT OFFICE.

ABEL RAIMOND ALEXANDRE GÉRARD DE RECONDO, OF PARIS, FRANCE.

APPARATUS ENABLING THE SPEED OF MOTOR-CARS TO BE REGULATED AND THE EXCESS OF SPEED RECORDED.

1,100,254.      Specification of Letters Patent.    Patented June 16, 1914.

Application filed November 3, 1908. Serial No. 460,859.

*To all whom it may concern:*

Be it known that I, ABEL RAIMOND ALEXANDRE GÉRARD DE RECONDO, a citizen of the Republic of France, and resident of Paris, France, have invented new and useful Improvements in Apparatus Enabling the Speed of Motor-Cars to be Regulated and the Excess of Speed Recorded, which improvements are fully set forth in the following specification.

The invention relates to speed indicating and controlling devices, and has for its object to provide means for indicating the current speed of a moving vehicle, limiting the speed to a predetermined rate, and indicating the total distance traveled. For these purposes the invention comprises an odometer, a speedometer connected therewith, which may be of the centrifugal governor type, tripping-mechanism connected with the speedometer and adapted to operate when the latter arrives at a predetermined point, fuel-controlling devices connected with said tripping-mechanism, and means connected with the fuel-controlling devices for recording and for limiting the possible number of infractions of the predetermined speed.

The invention consists further of certain features of construction and combinations of parts which will be fully described hereinafter and finally claimed.

In the accompanying drawings, Figure 1 is a top view of an apparatus embodying the invention, Fig. 2 is a top view, with parts removed, of the speedometer, the tripping mechanism, and the odometer, on a larger scale than Fig. 1, Fig. 3 is a front view of a portion of the devices shown in Fig. 2, Fig. 4 is a vertical section on line 4—4 Fig. 2, Fig. 5 shows in elevation a portion of the mechanism illustrated in Fig. 4, with parts omitted, and with parts in vertical section, Fig. 6 is a horizontal section on line 6—6, Fig. 4, Fig. 7 is a vertical section on line 7—7, Fig. 6, Fig. 8 is a vertical section on line 8—8, Fig. 2, Fig. 9 is a top view of a latch-mechanism, on line 9—9, Fig. 3, with parts in section, Fig. 10 is a vertical section on line 10—10, Fig. 9, Fig. 11 is a top view of the fuel-controlling means, Fig. 12 is a similar view showing the parts in different position, Fig. 13 is a horizontal section on line 13—13, Fig. 14, with parts omitted, and Fig. 14 is a side-view of the fuel-controlling means.

Similar reference-numerals indicate corresponding parts in the several figures of the drawings.

In the embodiment of the invention shown in the drawings, the speedometer and odometer are located on a base 302 secured to any desired part 300 of the vehicle. Fuel cut-off valves are employed, mounted on the same part or another part 301 of the vehicle. Said valves are adapted to be released for closing, and are normally held open by a tripping-mechanism including a power-transmitting device comprising a flexible and inextensible steel wire 12 within a flexible and incompressible conduit 13, which conduit may consist of a closely-coiled wire helix. On the base 302 is arranged a bed 10, and above the same a foot-plate 35 (Fig. 8) on which is supported by posts 37 a top-plate 36. A drive-shaft 14 is mounted vertically in said foot and top plates and is connected in any suitable manner with a moving part of the motor-vehicle, for example the hub of a wheel, so as to be driven at a speed proportionate to that of the vehicle. Such means of connection are well known and form no part of the invention and are therefore not described in detail.

The odometer comprises a dial-plate 15 and a base-plate 16 connected therewith by posts 17. Between said plates is arranged a train of counter-gearing 18 having any desired number of arbors, with corresponding dials and pointers 19, 20, 21, 22, 23. The primary arbor 24 carries below plate 16 a star-wheel 25, which is actuated one tooth at each revolution of a pin 26 on a disk 27 carried by a hub 29 on a vertical shaft 28 fixed at its upper end in a bracket 30 of the frame of the apparatus. Below the disk 27 the hub 29 carries a gear 31 which is driven by a pinion 32 on drive-shaft 14. A pawl 33 bears against the star-wheel and its wedge-shaped nose 34 and gives the star-wheel at each movement a forward impulse from the position in which it is left by pin 26, so that the next tooth of the wheel is brought in position to be engaged by the pin on the following rotation of the disk 27, and held in such position.

The drive-shaft 14 carries a gear 38 for operating the speedometer. A gear-train 39, 40, 41, 42, is mounted between the plates 35 and 36 and a bracket 73 and transmits motion at increased speed from gear 38 to a pinion 43 secured to shaft 44 of a speed-sensitive device of the governor type. Said device comprises jointed arms 45, 46, pivoted at their lower ends to a head 47 fixed to shaft 44, and at their upper ends to a head 48 which is slidable on the shaft. The arms are provided at their middle joints with weights 50, 51. When the rod 44 is rotated, the weights move outwardly under centrifugal force and depress the sliding upper head 48 against a spring 52 on shaft 44, the extent of downward movement of said upper head being dependent on the centrifugal force, which is itself dependent on the speed of rotation. The extent of depression of the head 48 thereby affords a measure of speed of the shaft and through the same of the vehicle. When speed is reduced, the force is diminished and spring 52 lifts head 48. The head is limited in upward movement by abutment with a bracket 53 which supports shaft 44 at its upper end. By such abutment, friction is caused between the head and bracket which assists in bringing the mechanism to rest. Limitation of upward movement of the head at this point prevents the weights, which project from the arms inwardly toward the spring 52 and would otherwise bear against the same, from contacting therewith.

Head 48 is provided above the pivots of the arms 45, 46, with an annular groove 54, in which is received the ball-shaped end 55 of one arm 56 of a lever pivoted to a standard 59 of the frame, the other arm 57 of which terminates in a toothed segment 58 which engages a pinion 60 on an arbor 61 supported at one end in standard 59 and at the other end in a standard 62 secured to a plate 63 supported on posts 64 rising from bed 10. To the arbor 61 is secured a pinion 65 which engages downwardly-projecting teeth 66 at the rear-portion of a rack, said rack having at its forward portion laterally-projecting teeth 67. The rack is guided in a housing 68 secured to a standard 69 rising from a cross-bar 193 on plate 63, and at its rear portion is guided by a guide-roller 70 supported on a standard 71, said roller bearing at its periphery on the top of the rack and thereby retaining teeth 66 in engagement with pinions 60, and having a circumferential flange 72 engaging the rack and preventing lateral displacement of the same in one direction, while lateral displacement in the other direction is prevented by standard 71. Teeth 67 engage a pinion 74 on an arbor 75 journaled in standard 69 and carrying at its upper end a pointer 76 movable over a dial 77 supported on posts 78 rising from plate 63. A spiral spring 79 is secured to shaft 75 and adjustably to standard 69 by means of a post and peg 80, and serves to keep all the parts in contact in return direction, so that there is no lost motion between the governor mechanism and the pointer. The latter thereby follows the movements of the former and by its position over the figures of the dial 77 indicates the current speed of the vehicle.

The valves may be located between the liquid-fuel tank and the carbureter, or between the carbureter and the motor of the vehicle. In either case, they operate to close the fuel-supply when they are tripped. The valve-mechanism comprises superposed plates 82, 83, supported by posts 84 on a base-plate 81, secured to the vehicle. A valve-housing 86 is mounted on the base-plate 81, and from the same extend tubular threaded heads 87, 88, adapted to be connected in the fuel-pipe of the vehicle, and through which heads the fuel enters and leaves the housing 86. The valves 89, 90, are provided in the housing with the usual valve-plugs, and above the housing with spring-barrels 91, 92, respectively, containing each a spiral spring actuating the valve in closing direction, the spring 85 being secured at its inner end to a stationary post 93 depending from the plate 83 within the spring-barrel 91, and the spring 94 being secured to a similar post 95 depending within the barrel 92. The barrels 91 and 92 are provided with top-plates 114 and 115, respectively, located in openings in the plate 82 and bearing at their peripheries against the plate, which plates are flush with the upper face of the plate 82. The top-plate of the barrel 91 overhangs the barrel and provides a flange 108 beyond the same. To the barrel 91 is pivoted a yoke 96, having a radially-projecting finger 97 which is engaged by an arcuate cross-head 98 vertically movable on the posts 84 and having a removable strap 99 adapted to retain the finger 97 in engagement with the top of the cross-head. A lever 100 is pivoted to standard 101 of the base-plate 81, and is connected at its upper end with an adjusting device comprising a connecting-rod 49 having a threaded end engaged by a socket 102 swiveled on the end of wire 12. The socket is guided in a tubular head 103 secured to plate 82 and to an end-plate 130. Head 103 is threaded at its outer end to receive a cap 104, against which bears the flexible tube 13. At its lower end lever 100 is provided with inwardly-curved feet 73 engaging the cross-head and adapted to lift the same when the lever is moved by a pull on wire 12.

To the pivot 105 of one arm of yoke 96 is pivoted a pawl 106, located in a recess in the arm and extending at its tooth 107 through an opening in the flange 108 of the valve. A spring 109 retains the pawl raised in the yoke. The length of the tooth 107 is such that when the yoke is in lower position shown in Fig. 14 the tooth does not project above the surface of the flange. A valve-operating handle 110 is removably secured by nut 111 to the squared upper end of a post 112, the lower end of which is fixed in a swinging lever-arm 113 pivoted to post 93 and movable over the surface of plate 82 and top-plate 114 of the first valve, and adapted to engage the tooth 107 when raised above the flange 108, and thereby move the valve against the tension of its spring 85 from closed to open position. For retaining the lever-arm in forward position a check-pawl 116 is employed, which is pivoted at 117 to a block 118 attached to the under side of plate 82. The tooth of the pawl projects through an opening in plate 82 and is retained normally projecting above the same as indicated in Fig. 14 by a spring 119. When arm 113 is moved to forward position (Fig. 12) the pawl 116 engages behind the arm and retains it there. For releasing the arm and handle, a releasing-rod 120 is provided, which is supported at its lower end on a lug 121 and extends vertically in plates 82, 83 and is provided at its upper end with a detachable button 122. Spring 119 holds the rod 120 normally raised. A collar 123 fixed on the rod 120 between the plates 82 and 83 limits vertical movement of the rod, thus preventing on the one hand depressing of the same to so great an extent as to strain the pawl spring 119, and on the other hand preventing accidental removal of the rod from operating position.

The second valve is provided with a lever 124 secured to the top-plate 115 and projecting beyond the same at one end into engagement with a stopscrew 125 secured in plate 82, and having the other end 126 cam-shaped and in engagement with a motion-transmitting tapering wiper-lever 127 pivoted to the plate 82 and limited in its movement away from the end 126 by an abutment 128 on plate 82, which thereby also serves as an abutment limiting further return movement of lever 124 and the second valve. Arm 113 carries a forwardly-extending curved lug or nose 129, which is adapted to engage lever 127 and press the same against cam 126, thereby operating the valve from closed position shown in Fig. 11 to open position shown in Fig. 12, in which open position it is retained so long as the arm is retained by pawl 116 in forward position. When the arm is released, spring 94 returns the valve to closed position and lever 124 and wiper 127 to position shown in Fig. 11. The wiper assists in starting the valve, by its leverage over cam-face 126 as shown in Fig. 11. During operation it divides the friction and thus reduces wear on the parts.

A segment 131 is pivoted to post 93 between plates 82 and 83, and is provided at its outer edge with a series of ratchet-teeth 132 and at its upper face with an indicating-plate 133 having numbers corresponding to the teeth. Posts 181 support the plate 133 in the segment. The segment is actuated by a spring 134 coiled around a collar 135 on post 93 above plate 83, and secured at one end to the segment and at the other end to the plate. The segment is limited in forward movement by abutment of one of the posts 181 with plate 83, and in return movement by a stop-screw 182 on the segment abutting against said plate. A cam-lever 136 is pivoted to plate 82 and extends at its cam-surface above plate 83. At its opposite end it is pivoted by means of a link 137 to a driving-pawl 138 which is provided with a longitudinal slot 139 through which passes a screw securing the pawl to plate 82. Link 137 is pivoted to the pawl at a point behind the slot. To link 137 is attached one end of a tension-spring 140, the other end of which is secured to plate 82. A curved arm 141 is attached to post 112 and extends above plate 83 in position to engage by means of its forward end the cam-face of lever 136, when handle 110 is moved for opening the valves. By this operation cam-lever 136 is moved from the position shown in Fig. 11 to that shown in Fig. 12, and pawl 138 is thereby moved forward, advancing the segment one tooth.

A check-pawl 142 on plates 82, actuated by spring 143, retains the segment in advanced position against tension of its return-spring 134. When handle 110 is returned, carrying arm 141 away from the lever 136, spring 140 returns the lever, link and pawl 138 into retracted position, ready when the arm 141 is again advanced to again move the segment for a distance of one tooth. The nose of pawl 138 is forked and is adapted to engage in the fork the rearmost tooth 144 of the segment. When the segment has been by repeated actuations brought to fully advanced position, on the return movement of the pawl its nose passes off the last tooth. Spring 140 by its pull on link 137, causes the link to assume a position whereby pawl 138 is now directed so that upon its next actuation it will engage with its fork 145 the rearmost tooth of the segment. If it be now attempted to operate handle 110, the same will be arrested after a short movement by abutment of arm 141 against lever 136, which is retained in interfering position by engagement of the nose of the pawl with the rear tooth 144, and abutment of the forward post of the segment against plate 83. The segment may be returned to original position by releasing the pawls from the teeth. This is accomplished by a release-member 147 pivoted to pawl 142 and connected by slot and screw with pawl 138, and provided with an intermediate detachable operating handle 148. When this member is pulled in outward direction, both pawls are moved out of engagement with the segment, and spring 134 returns the segment into original position ready for reëngagement.

For preventing opening the second valve unless the parts be first placed in position for operating also the first valve, a stop-pin 151 is provided, vertically movable in plate 82 and in a guide-tube 152 extending below the same, said pin projecting above the plate 82 and being movable into and out of the path of nose 129. The pin is supported by a lever 153 of spring-wire, which is attached to plate 82 and extends through an eye in the lower end of pin 151 and beyond the same is bent upward and then downward (Fig. 14) and curved approximately concentric with the first valve (Fig. 13) until its forward end extends beneath a finger 155 projecting radially from and rotatable with the first valve. When said valve is moved, the finger 155 rides upon the curved portion 154 and depresses the same, drawing pin 151 down so that its upper end is below path of nose 129. After finger 155 passes the cam-portion 154, pin 151 is retained depressed by abutment at its upper end against bottom of nose 129. When the nose is returned, the pin again rises into position.

An indicator 157 is pivoted to post 93 between plate 83 and collar 135, and swings in a horizontal plane above arm 141 and lever 136 so as not to interfere therewith. The indicator is provided at its outer end with a portion 158 colored red, and an adjacent portion 159 colored white. A slot 160 in the indicator-plate 157, and screw 161 in the same and secured in plate 83, guide the indicator and limit its motion.

A casing 162 covers the valve-mechanism described, and is secured to plate 81 by screws (not shown) passing upwardly through said plate into the casing. For placing the casing in position, handle, 110, button 122, and handle 148, are removed. The case is then lowered over the mechanism. Heads 87, 88 and 103 enter recesses extending upwardly from the lower edge of the casing. Post 112 projects through an arcuate slot 165 in the casing top. Pin 120 projects through an opening in the top of the casing. A screw-threaded stud 166 of the release-member 147 is located opposite an opening in the side-wall of the case, said opening being of such size that the handle 148 may be inserted through the same and screwed upon the stud. The casing is provided in its top with a sight opening 168 in such position as to expose to view the cipher of the indicator-plate 133 when the segment 131 carrying said plate is in initial position, and the other figures in succession, one at a time, when the indicator is moved. The casing is also provided in its top with a sight-opening 169 to expose to view the red portion 158 of indicator 157, when the latter is in its position shown in Fig. 11 to which it is normally returned and retained by its spring 170, and to expose to view the white portion only, when the indicator is in forward position to which it is moved on rotation of the first valve by means of a stud 171 projecting upwardly from the top of the valve and engaging a lug 172 projecting downwardly from the indicator-plate 157. The indicator 133 thereby forms a recorder showing, at any time, the number of times the valves have been opened. The indicator 157 does not move from red to white until the parts have been so far advanced as to open not only the first but also the second valve. It therefore indicates at any time whether the valves are open, by showing white, or closed, by showing red.

The parts being in initial position (Fig. 11), for opening the valves wire 12 is drawn outwardly, which causes rise of cross-head 98 against the action of springs 173 secured upon plate 81 and bearing downwardly on studs 174 one at each side of the crosshead. Finger 97 is thereby raised, bringing tooth 107 above the top of the first valve. Wire 12 is retained taut, thus retaining the parts lifted. Handle 110 is moved forward, whereby arm 113 engages pawl-tooth 107, thereby rotating the first valve. Finger 97 bears upon lever 153 at 154, lowering pin 151 out of path of nose 129. Arm 141 engages lever 136, causing pawl 138 to advance segment 131 one tooth and show figure 1 in sight-opening 138. Nose 129 engages wiper 127, which swings cam-lever 124 and opens the second valve. Simultaneously stud 171 engages lug 172 of indicator 157 and moves the same so as to show white 159 at sight-opening 169. Arm 113 passes beyond pawl 116 and is engaged thereby and prevented from returning, thus holding first and second valves open. Fuel is now free to pass through the valves and heads 87, 88, and thence to the carbureter or motor.

When from any cause wire 12 is permitted to relax, cross-head 98 is depressed by its springs 173, bringing down finger 97, thus withdrawing tooth 107 from arm 113. The first valve is immediately returned by its spring 85 to closed position. During this return, pin 171 passes by way of a recess 178 in arm 113, to opposite side of the arm, thus releasing indicator 157 and permitting the same to be moved by its spring 170 in return direction. The indicator abuts against the forward edge of a plate 180 upon arm 141, in position showing red, thereby indicating that the valve is closed. Plate 180 is preferably extended at the rear-side of post 112, forming there a blind, which constantly closes slot 165. The indicator is stopped by plate 180 slightly in advance of abutment with the screw 161, and thereby the hammering due to repeated returns of the indicator is taken off the screw and received by the plate, which is provided with a broad end to receive the blow without injury. Button 122 is depressed, causing pawl 116 to descend out of path of arm 113, which may now be moved in return direction to initial position, thus releasing wiper-lever 127 and valve 90, which is returned by its spring 94 to closed position. Arm 136 and pawl 138 are returned by spring 140. Indicator 157 comes to rest against limiting screw 161.

Repeated operations of opening and closing the valves 89, 90 and indicating the number of times opened may be thus accomplished until the last tooth 144 of the segment is reached, when the parts are arrested as before described. In this advanced position, lever 136 stands in the path of arm 141 and prevents advance of the same and of post 112 and attached parts to the point of opening of the valves. For opening the valves, handle 148 of the pawl release member 147 is drawn outwardly, disengaging the pawls, segment 131 returns under pressure of spring 134 to initial position with stop screw 182 against plate 83 and the cipher of the scale at sight-opening 168. The opening and closing operations may now be repeated as before to the limit of the recorder, which may have any desired number of teeth in its segment 131, and corresponding figures of the scale.

In case it be attempted to open the valves without first drawing taut wire 12 and thus raising tooth 107, no operation of the valves takes place, because arm 113 which is swung by handle 110 has no engagement with the first valve, and nose 129 is arrested by pin 151 before it can arrive at wiper 127. A slight movement of pawl 138 is caused by arm 141 engaging lever 136, but this movement is insufficient to operate the segment 131 for a distance of a tooth, and on returning handle 110 all parts resume their original position.

Handle 148 is provided with an opening in register with a like opening in a post 183 projecting from the casing, through which openings passes the bail of a detachable lock 184, which prevents release of the segment after operation to capacity, and by retaining the handle upon the stud 166 prevents removal of the casing, whereby the mechanism is protected against accident and tampering.

The tripping mechanism by which the wire 12 after having been drawn taut is relaxed, is controlled by the speed of the vehicle through drive-shaft 14 and the speedometer gearing, governor and arbor 75. A trigger-pin 185 extends radially from arbor 75 and normally supports a cylindrical trigger 186 which is both rotatable and vertically movable on said arbor, and is provided in its shell with a recess 187 extending from the lower edge upwardly. A pin 188 projects radially from the shell and is vertically movable in a fork 189 secured at its lower part to a pinion 190 engaging a rack 191 in a guide 192 on cross-bar 193. The guide is provided with slots 194 in which move screws 195 secured to the rack. At one end the rack is connected by a connecting-rod 196 with a cam-lever 197 pivoted above the rod 196 to a standard 198 rising from bed 10. Below the rod 196 lever 197 is provided with a cam 199 tangential to the arc of the lever whereby the lever is adapted to be swung on its pivot 200 by a descending finger 201 striking the cam transversely. A tension-spring 232 secured to the lever and to a bracket 203 of the standard, actuates the lever rearwardly, that is to say, in finger-lifting direction of the cam. When the finger is lifted out of contact with the cam, return motion of the lever is limited by abutment of screws 195 with the ends of their slots 194. When arm 201 strikes the cam and moves the lever, rack 191 is moved, rotating pinion 190 and fork 189 through part of a rotation, whereby trigger 186 is correspondingly moved and the relation of its notch 187 to trigger-pin 185 changed, to greater or less distance than before from the trigger-pin, thereby requiring movement of the pin through a longer or shorter arc before arriving at the notch.

Arm 201 is mounted rotatably on and extends radially from a shaft 202 and is actuated thereon toward cam 199 by a spring 205 coiled on the shaft and secured at one end to an adjustable collar 218 and at the other end to the arm or finger 201. An adjustable arm 204 is fixed by set-screw to the shaft and is adapted to engage finger 201 and lift it from the cam. Shaft 202 is journaled in bearings 206, 207 secured to bed 10, and carries at one end a radially-extending staff 208 supporting at its outer end a signal 209 preferably of metal or other stiff material, and of any suitable shape and color. At its opposite end shaft 202 carries a handle 210. At one side of the shaft 202 is pivoted in a standard 211 a signal-indicator 212 of sector shape, the outer face of said indicator at one side of a middle radius being colored red, and at the other side white. Said indicator is operated by a pin 213 which extends radially from a collar 214 secured on shaft 202 by a set screw. When the rod 202 is operated in signal-raising direction as shown by the arrow in Fig. 7, pin 213 engages an extension 216 of the indicator and lifts the same against tension of its spring 217. When the shaft is returned, the spring returns the indicator to lowered position, with one edge abutting against standard 211, and retains it there until again operated.

On a post 219 rising from bed 10 is secured a dial 220 provided with figures indicating rates of speed, and with a recess 221 at each figure in which is adapted to be seated a button 222 at the end of a handled pointer 223 secured to an arbor 224 at the center of the dial. A stop 225 on the dial limits rotation of the pointer in both directions. Handle 223 is of spring-metal, and arbor 224 has slight vertical play, whereby easy disengagement and movement of the button from one recess to another is permitted, and the button is caused to reliably engage in the recesses. At its lower end arbor 224 is journaled in bed 10 and carries above the same a pinion 226 engaging a gear 227 by which motion of the pointer 223 is transmitted to a rack 228 guided on the bed between guides 229 thereon and a horizontal guide 230 secured to post 219. Guide 230 retains the rack in the ways 229 and also serves to guide at one side an abutment 231 integral with the rack 228 and provided at its upper edge above the rack with a plurality of steps corresponding to the number of recesses or seats 221.

Abutment 231 is located adjacent and parallel to cam-lever 197, and in the path of finger 201, so that when the finger descends upon cam 199 it contacts also with and is arrested by abutment 231. The steps are arranged in order of height so that when pointer 223 is at the lowest figure of the dial 220 the highest step is presented to finger 201. Shaft 202 is inclined to bed 10, being higher at standard 207 than at standard 206, and where it passes the abutment 231 it is approximately in the plane of one of the middle steps of the same, so that under the average conditions of speed, corresponding to said steps, finger 201 will be enabled to rest approximately flat and horizontal upon and thereby engage to the best advantage the cam 199 and the step. The treads of said middle steps are made approximately horizontal to receive finger 201, and the upper steps are laterally beveled as indicated in Fig. 4. toward the finger, so as to permit good engagement of the finger therewith. Thus, notwithstanding in Fig. 4 the top step is shown as considerably above the plane of the top of cam 199, when the abutment is advanced so that that step comes in the path of the finger and the latter is operated to rest on said step, the finger by reason of its downward inclination from the step bears upon and imparts a limited forward movement to the cam, thereby causing corresponding movement of trigger 186. The lower steps of the abutment may be laterally beveled in opposite direction. The finger 201 being in raised position, pointer 223 is placed at any desired figure of the dial, whereby the corresponding step is placed in the path of the finger, and the latter permitted a corresponding descent, the cam is correspondingly moved and the trigger 186 accordingly set. The pointer may be moved from a lower to a higher figure of the dial without raising finger 201. Upon moving the pointer, abutment 231 is retracted beneath the finger and the latter descends under pressure of its spring 205 from step to step and at each descent actuates the cam for an additional distance, causing corresponding advance of trigger 186 and bringing the same to rest in a position corresponding to the speed at which the pointer is dropped.

Arbor 75 is journaled at its lower end in the upper end of a post 233, which is secured in plate 63 and passes through and is braced by cross-bar 193. Pinion 190 is mounted on post 233 at the upper end thereof and retained thereon by a clip 234 secured to the cross-bar. To post 233 is pivoted a latch-plate 235, and above the same, also pivoted to the post, is a latch-lever 236, which carries at its outer end a socket 237 adapted to receive the reduced inner end of a detachable operating handle 238. Said latch-lever also carries at its outer end an arcuate blind 239, which bears at its lower edge on bed 10 and thereby supports and guides the lever 236 at its outer end. A curved horizontal bracket 240 is secured to the plates 63, 193, and carries at its outer end a check-pawl 241 projecting downwardly from the bracket in the path of latch-lever 236 and adapted to engage and retain the same in advanced position.

Latch-plate 235 extends horizontally from post 233 and is supported and guided on plate 63. Beyond said plate it is provided with a latch comprising a pawl 242 and a keeper 243 pivoted between a depending portion 244 of the latch-plate 235 and an outer plate 245 connected therewith by bolts 246, two of which bolts form pivots for the pawl and keeper. The keeper is provided with a leg 247 extending downwardly and outwardly beyond the edge of latch-plate 244 and limited in inward movement by abutment with a lower inturned horizontal portion 248 of plate 245. When in such inward position a curved arm 249 of the keeper retains in raised position a finger 250 of the pawl, and thereby retains the nose of the pawl in engaging position above plates 244, 245 and in the path of a pawl 251 which is carried by and projects from the lower face of latch-lever 236 in opposite direction to pawl 242. Pawl 242 is actuated in engaging direction by a spring 252 connected with a pin 253 extending downwardly from the pawl, and at its other end connected with plate 244, and is arrested in engaging position by abutment of the pin against one of the bolts 246 which forms a stop, and also by abutment of finger 250 with a nose 254 of the keeper, finger 250 being located between said nose and curved arm 249.

A lever 255 is pivoted to bed 10 and connected at one end by a connecting-rod 256 with latch-plate 244, and at the other end with wire 12. A tension-spring 257 connected with the wire-end of the lever and with bed 10 actuates the lever so as to pull the latch rearwardly into rear position shown approximately in Figs. 2, 6, 9 and 10, in which position motion of the parts is limited by abutment of latch-plate 235 with a stop 258. In this position, wire 12 is in retracted condition and pawl 107 of the first valve depressed. Latch-lever 236 is capable of rearward movement to a point beyond pawl 242, so that pawl 251 is brought into engaging position behind pawl 242 as indicated in dotted lines in Fig. 10. Motion of the latch-lever rearwardly is limited by abutment of the lever with bracket 240 (Fig. 3).

Trigger 186 is provided at its top with a hub having a flange 259 by which the trigger is swiveled to a curved connecting-rod 260 which is guided in a fork 261 secured to plate 235 and pivoted at its lower end to one arm of a crank 262, the other arm of which is pivoted to a link 263 pivoted at its opposite end to the lower end of a release-lever 264 pivoted at its upper end to latch-plate 244. Crank 262 is supported on plate 244 between brackets 265. Thus the parts mentioned, from connecting-rod 260 to release-lever 264, are all supported on latch-plate 235, 244, and are movable with the same in an arc about post 233 as a center. Bed 10 is provided with an opening 266 (Fig. 5) for permitting swinging of the crank, link and lever 264. The latch-plate 244 carries at its inner face a pawl comprising a pawl-lever 267 pivoted to swing horizontally, and extending at the keeper-end of the latch-mechanism beyond plate 244, and spring-actuated at its rear end into contact with release-lever 264. At its forward end lever 267 carries a swinging tooth 268 which is actuated by a spring 269 on the lever into outward, engaging position, into the path of keeper-leg 247. It is limited in such position by abutment with the pawl-lever 267.

When latch-arm 236 is moved by handle 238 from rearmost position in forward direction as indicated by arrow in Fig. 2, pawl 251 engages pawl 242, causing the latch-mechanism to be carried along with the arm. In this position, pawl-finger 250 is bearing down on keeper-arm 249, and the leg 247 of the keeper is pressing outwardly against pawl-tooth 268, which is retained in engagement therewith by release-lever 264 acting against the rear end of pawl-lever 267 against the tension of spring 270, said release-lever 264 being held in such position by the lever-mechanism described and which is sustained by the trigger resting on trigger-pin 185. The latch-arm is brought forward of check-pawl 241, which then retains all the parts in forward position. Wire 12 has been during this movement drawn taut by abutment of the flexible helix 13 at one end against cap 104 and at the other end against an adjustable nipple 271 screw-threaded in a socket 272 secured to bed 10.

Trigger 186 and its pin 185 are so located that when a speed of the vehicle in excess of that for which pointer 223 is set is attained, the trigger-notch arrives at pin 185 and the pin enters therein and the trigger falls, under the combined action of its weight and the weight of connecting-rod 260, and of the pressure of spring 270. The release-lever is thus permitted to swing back and pawl 267 to be moved by spring 270 so as to withdraw tooth 268 from keeper-leg 247, which permits the keeper to swing on its pivot into position shown in dotted lines in Fig. 10, in which position arm 249 no longer sustains pawl 242 in engaging position with pawl 251, but by permitting finger 250 of the pawl to drop, permits the pawl to tilt backward under the continued pressure against pawl 251, until the angle between the engaging faces of the pawls is so reduced that both pawls yield against the pressure of their springs and pass out of engagement. The pawls then at once resume their erect positions. The latch-plate 235, 244 and attached parts continue their return movement under influence of spring 257 to rearmost position. The latch-lever 236 and handle 238 remain in forward position.

During return motion of the latch-mechanism, trigger 186 is re-set by a cam 274 secured at its higher end to latch-plate 235 and extending at the rear of the same beneath a lifting-lever 275 pivoted at one end to bracket 240 and at the other end engaging trigger 186 at its lower edge and lifting the same above the trigger-pin. By the lifting of the trigger, release-lever 264 is swung outwardly, re-setting pawl-tooth 268 in the path of keeper-leg 247. The return motion of the parts under tension of spring 257 is rapid, and should tooth 268 be replaced in the path of leg 247 before the leg had itself descended, the two parts will engage, with the leg extending downwardly at the outer face of the tooth. The tooth yields against spring 269 and permits the leg to pass into place, and then springs outwardly into position. For facilitating return of the keeper, pawl-spring 252 is arranged to bear upwardly against keeper-arm 249 as shown in Fig. 10, in dotted lines.

The lifting-lever 275 supports trigger 186 raised off pin 185 while the latch-mechanism is in rear position. When the latch is moved forward as described, cam 274 permits the lever to descend, thus allowing the trigger to rest upon its pin. Reliable return of the latch to initial position is secured by abutment of the latch-lever 236 with the high rear end of cam 274 during return of the lever 236.

Over the odometer, speedometer and tripping-mechanism is placed a casing 276. The flexible connection 12, 13, may pass through said casing or through an aperture 277 in bed 10. The case is at one part curved in an arc around post 233 as a center, or approximately so, and in said part has a horizontal slot in register with socket 237, so that the handle 238 may be inserted therein and the latch moved. Blind 239 covers said slot at each side of the socket, and is made of spring metal and curved in an arc slightly larger than the arc of the casing, as indicated in Fig. 6, so as to press against the casing and exclude dust. At the top, the casing has an opening 280 for the odometer dial-plate 15, and an opening 281 for the speedometer dial 77, both of which are preferably closed by glass. An opening 282 is provided in the casing-top for the dial 220 of the tripping-mechanism, which opening is preferably closed by a cover 215 hinged to the casing-top at one side of the opening and provided with an arm 283 extending to the side of the casing and there secured to a lug 285 by a detachable lock 284. At one side of the casing is an opening 286 for the indicator 212. The casing is secured at its lower edge by screws through a flange 287 to base 302. From its lower edge extend upwardly vertical slots adapted to receive shaft 202 when the casing is placed in position. In the casing is supported a push-button comprising a tube 288 in which is guided a push-rod 289 adapted at its end below the tube to engage pawl 241 and move the same in releasing direction, and spring-actuated in opposite direction against a sleeve 290 in the upper end of the tube. The sleeve receives and guides a removable thumb-piece 292 adapted to depress the push-rod. For additionally securing the valve-casing in position, a post 298 extends from plate 83 and is provided above the casing with an opening receiving a lock 299.

Handle 210 having been turned so as to raise the signal 209, whereby finger 201 is raised from abutment 231, setting-pointer 223 is now set at the figure of the dial indicating the speed which it is desired that the vehicle shall not exceed. The handle 210 is now returned, depressing the signal 209 and causing finger 201 to set the trigger 186. The recorder 133 having been set at zero in the manner described, and the locks 184, 284 and 299 having been secured, handle 238 is advanced from initial position, thereby setting the latch and raising tooth 107. Handle 110 is now advanced from initial position, thereby turning the valves and admitting fuel, and simultaneously advancing the recorder one figure, and causing indicator 157 to show white in the sight-opening 169. When the vehicle is in motion and drive-shaft 14 operated, the odometer operates as a counter and indicates by the position of its pointers the total distance traveled. The speedometer pointer swings constantly over its dial, indicating the varying speed of the vehicle. So long as the speed remains below that to which pointer 223 is set, the valves remain open. If, however, it should be desired for any reason to close the valves, this may be done at any time by depressing button 122, whereby pawl 116 is disengaged from valve-arm 113. The valve-springs now close the valves, causing indicator 157 to show red. Handle 110 is moved back to initial position owing to continued engagement therewith of pawl 107 of the first valve. The valves can now be reopened, and in doing this the recorder is actuated to its succeeding figure. The setting of pointer 223 to the speed desired has caused rotation of trigger 186 so that its notch 187 is at that angular position relatively to the pin, 185, corresponding to the angular position of the figure of the predetermined speed on the dial 77, relatively to the speedometer pointer 76, with which the pin has similar movement. Thus, the predetermined speed having been reached, the pin 185 arrives at the notch 187, the trigger falls and releases the latch, which recedes, permitting wire 12 to relax, tooth 107 to descend, and the first valve to close. Fuel is thus shut off. For re-starting, thumb-piece 292 is depressed, releasing handle 238, which is then moved rearwardly by hand and again moved forwardly, thus re-setting the latch and trigger. Button 122 is depressed, permitting handle 110 to be moved rearwardly and then again forwardly, re-opening the valves and advancing the recorder one figure, and setting the indicator 157 at white. The allowed speed may be exceeded the number of times permitted by the recorder. After the last time, the forked nose of pawl 138 engages segment 131 and prevents reopening of the valves, as described. It then becomes necessary to release lock 184 and, by drawing handle 148, release the recorder and permit the same to return to initial position.

The angular position of arm 204 on shaft 202 relatively to signal 209 and steps of the abutment 231 is such as to lift the finger 201 from the topmost step, which corresponds with the slowest figured speed on the speedometer dial, after the signal 209 is raised above the casing, that is to say, at a point when it approaches its fully raised position. When finger 201 is so completely raised from the uppermost step, lever 197 is moved by its spring 232 an additional distance rearwardly before being stopped by screws 195, thereby setting trigger 186 to release at a point of lower speed than the lowest speed on the dial, and at any arbitrary low speed desired, being the lowest speed at which the speed-controlling device is adapted to operate, and which, instead of being indicated by the pointer on the dial 220, is indicated by the presence of the signal, appearing above the casing. When this speed, for example, is the lowest legal speed permitted within villages, the exposed visual signal 209 indicates that the vehicle is traveling under a speed-controlled mechanism set to operate at such legal speed. The signal 209 is sustained in elevated position by abutment of its staff 208 against a rest 293 secured to the base 302 and sustaining the same at one side of the center of gravity, so that the weight of the overhanging signal 209 retains the staff against the rest. Rise of signal 209 is accompanied by a showing by indicator 212 of red in opening 286, and the lowering of said signal by a showing of white.

Division of the device into two parts connected by flexible power-transmitting means, enables the valve-mechanism and the tripping-mechanism to be conveniently placed at separate parts of the vehicle, as, for example, the tripping-mechanism, odometer and speedometer at a point within the vehicle within easy view and reach of the driver, but the valve-mechanism at a point remote from his seat, so that it will be necessary for him to alight from the vehicle to open the valves. The necessity of getting out of the vehicle proves an additional deterrent against excessive speed.

The device enables penalties to be assessed for violations of speed. To accomplish this, the device is initially set by an authorized official for a legal speed, and is then locked and the keys retained by him. After the limited number of infractions have been recorded, it is necessary to the further use of the vehicle that the device be released by him, thus giving him an opportunity to assess such penalties as are prescribed for the violations recorded.

It is obvious that changes may be made in the construction without departing from the spirit of the invention.

I claim:

1. The combination of a speed-controlled mechanism, a fuel-valve controlled by said mechanism, and means for locking said valve after a predetermined number of operations of the same.

2. The combination of a speed-controlled mechanism, a fuel-valve controlled by said mechanism, means connected with said valve for indicating the number of operations of the same, and means for locking said valve after a predetermined number of operations of the same.

3. The combination of means controlling a source of power, a speedometer, and a manually operable tripping mechanism between said speedometer and controlling means and adapted to retain said controlling means in open position.

4. The combination of a speed-controlled mechanism, a fuel-valve spring-actuated in closing direction, a second fuel-valve independent of the first valve and also spring-actuated in closing direction, and means connecting said speed-controlled mechanism with the first valve.

5. The combination of a drive-shaft, an odometer connected therewith, a speedometer connected therewith, fuel-valves, a tripping mechanism between said speedometer and fuel-valves, means for setting said tripping mechanism to operate at a predetermined speed, a casing for said valves, and an independent casing for said odometer, speedometer, tripping mechanism and setting mechanism.

6. The combination of means controlling a source of power, a speed-controlled mechanism connected therewith, means for setting said mechanism to operate at a predetermined speed within a limited range of speeds, means for setting said mechanism to operate at a speed below said range, and a visual signal connected with said last-named means.

In testimony whereof I have signed this specification in the presence of two subscribing witnesses.

ABEL RAIMOND ALEXANDRE GÉRARD de RECONDO.

Witnesses:
 EMILE LEDRET,
 H. C. COXE.